(12) United States Patent
Hsieh

(10) Patent No.: US 7,428,380 B2
(45) Date of Patent: Sep. 23, 2008

(54) PORTABLE ELECTRONIC DEVICE

(75) Inventor: Yi-Hsin Hsieh, Taipei (TW)

(73) Assignee: Inventec Corporation, Taipei (TW)

( * ) Notice: Subject to any disclaimer, the term of this patent is extended or adjusted under 35 U.S.C. 154(b) by 420 days.

(21) Appl. No.: 11/274,255

(22) Filed: Nov. 16, 2005

(65) Prior Publication Data

US 2007/0110429 A1   May 17, 2007

(51) Int. Cl.
*G03B 17/18* (2006.01)
*G03B 19/00* (2006.01)
*H04N 5/222* (2006.01)
*H04N 5/225* (2006.01)

(52) U.S. Cl. .................. 396/287; 396/429; 348/333.06; 348/376

(58) Field of Classification Search .................. 396/287, 396/429; 455/550.1, 556.1, 575.1, 575.3, 455/575.8; 348/14.02, 333.06, 333.07, 375, 348/376
See application file for complete search history.

(56) References Cited

U.S. PATENT DOCUMENTS

| 7,359,003 | B1* | 4/2008 | Knighton et al. | ............ 348/376 |
| 2002/0187818 | A1* | 12/2002 | Kang | ......................... 455/575 |
| 2005/0090296 | A1* | 4/2005 | Gordecki | ................. 455/575.3 |
| 2005/0272462 | A1* | 12/2005 | Okamoto | ................. 455/550.1 |

FOREIGN PATENT DOCUMENTS

TW           M252039        12/2004

* cited by examiner

*Primary Examiner*—W. B. Perkey
*Assistant Examiner*—Minh Phan
(74) *Attorney, Agent, or Firm*—Rabin & Berdo, P.C.

(57) ABSTRACT

A portable electronic device adopts a modular design structure and includes a display screen, a picture taking module and a control module that can be swiveled relative to one another at various angles to provide different operation modes. When in use, due to the swiveling relationship between the display screen, picture taking module and control module, different operation modes can be achieved to meet the requirements of users' different using habits.

4 Claims, 5 Drawing Sheets

PORTABLE ELECTRONIC DEVICE

BACKGROUND OF THE INVENTION

1. Field of Invention

The present invention relates to a portable electronic device and particularly to a portable electronic device which has a display screen, a picture taking module and a control module that are movable relative to one another to provide multiple use modes.

2. Related Art

The general camera phone has to be held by hands to face a targeted object during picture taking. If users want to take their own picture, the distance is limited to their own arm. To take the picture of the upper portion or full profile of a user's body is difficult. They often have to ask other people to do that. As security is a growing concern nowadays, to hand over valuable goods to other people is risky, especially handing over an expensive camera to a stranger to take pictures. Instead of taking a picture, the stranger could run away with the camera. To remedy this problem, a handset equipped with a pedestal was developed, such as R.O.C. patent publication No. M252039 discloses a camera phone with a built-in pedestal. There is a coupling trough on the backside of the handset to hold an extendable pedestal. The pedestal may be extended for anchoring so that the camera phone can be positioned firmly to take a picture. The pedestal may also be retracted in the coupling trough to be integrated with the phone.

In the previous example, as the handset has included the pedestal on the backside, the weight of the handset increases, and the thickness is greater. It is not convenient to carry.

SUMMARY OF THE INVENTION

In view of the aforesaid problems, the primary object of the invention is to provide a portable electronic device, which adopts a modular design. Different modules can be swiveled to different angles, and the portable electronic device can also be held upright.

To achieve the foregoing object, the portable electronic device according to the invention includes a display screen, a picture taking module and a control module. The picture taking module is coupled with the display screen in a swiveling manner. The control- module also is coupled with the picture taking module in a swiveling manner. By swiveling the relative angles among the display screen, the picture taking module and control module, different operation modes can be achieved. Thereby, the portable electronic device can be used in many ways. Aside from offering an independent bracing effect, the portable electronic device of the invention can also be used according to a user's individual preference and common operation modes.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given in the illustration below only, and thus is not limitative of the present invention, wherein.

DETAILED DESCRIPTION OF THE INVENTION

Figure 1:
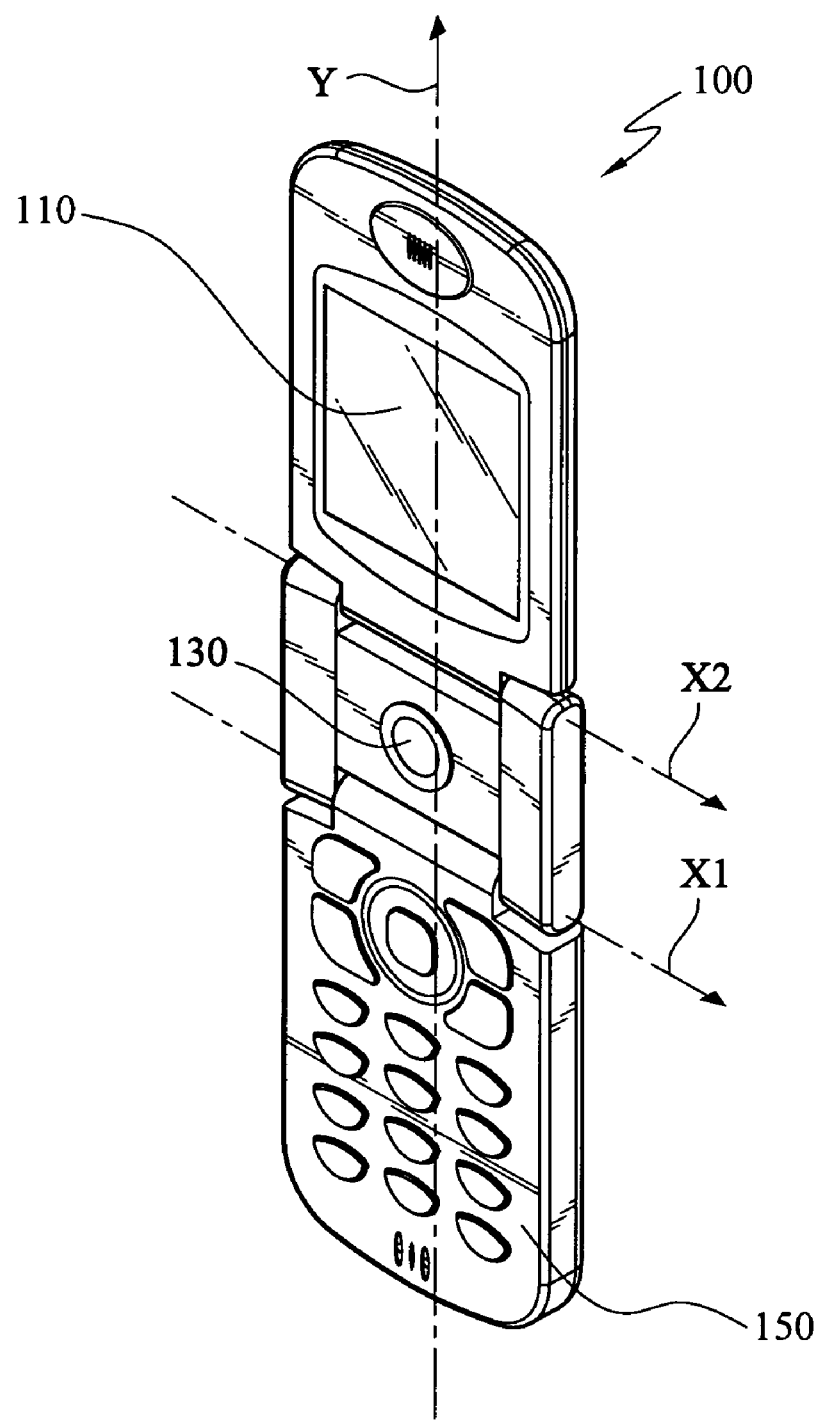
FIG. 1 is a perspective view of the invention.

Referring to FIG. 1, the portable electronic device 100 of the invention includes a display screen 110, a picture taking module 130 and a control module 150. The display screen 110 and the picture taking module 130 are coupled in a swiveling manner that the display screen 110 is capable of rotating around two perpendicular axes, axis X2 and Y. The picture taking module 130 and the control module 150 also are coupled in a swiveling manner that the control module 150 is capable of rotating around two perpendicular axes, axis X1 and Y. When in use, due to the swiveling relationship between the display screen 110, picture taking module 130 and control module 150, different operation modes can be achieved to meet the requirements of users' different using habits. In other words, the picture taking module 130 is swivelably coupled with the display screen 110 to allow the display screen to be rotated around a first axis (axis X2) and a second axis (axis Y). The control module 150 is swivelably coupled with the image taking module 130 to allow the control module 150 to be rotated around a third axis (axis X1) and the second axis (axis Y) such that the display screen, the picture taking module and the control module are swivelable relative to one another at various angles to provide different operation modes. The display screen is a liquid crystal display.

Figure 2:
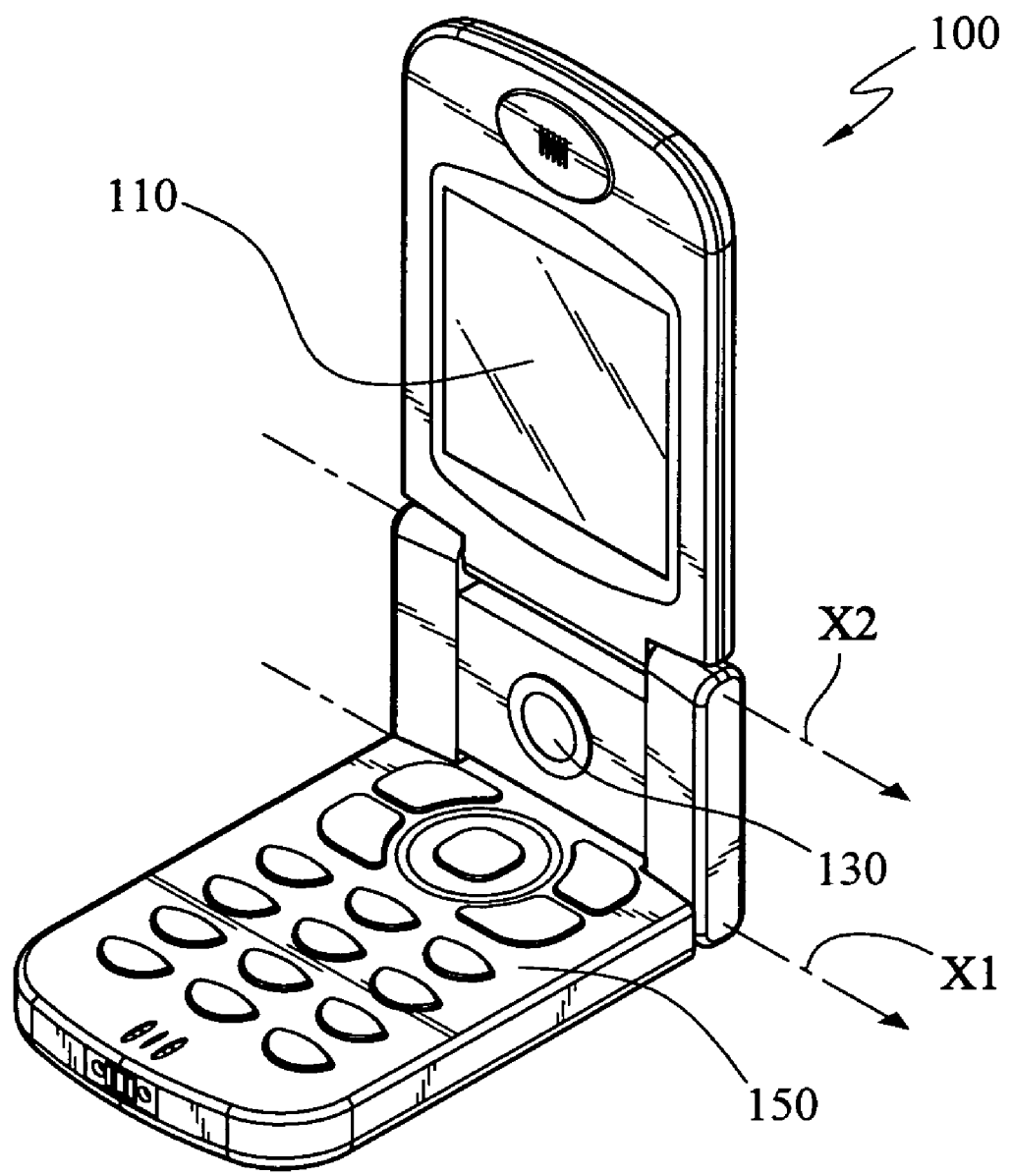
FIG. 2 is a schematic view of the invention in a first use condition.

Refer to FIG. 2 for a first use condition of the invention. No swiveling takes place between the display screen 100 and the picture taking module 130. But the control module 150 and the picture taking module 130 are turned normal to each other. That means that the control module 150 rotates around axis X1. Hence when taking pictures through the picture taking module 130, users can stand in front of the picture taking module 130 to see the captured image on the display screen 130, and adjust their position and distance relative to the picture taking module 130, to get the best possible image.

Figure 3A:
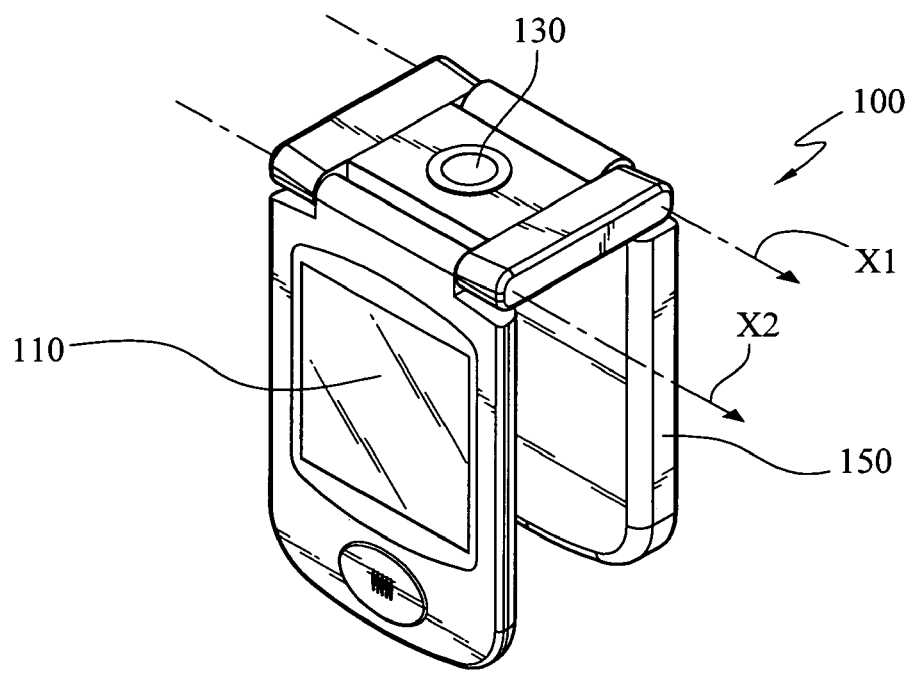
FIGS. 3A and 3B are schematic views of the invention in a second use condition.
Figure 3B:
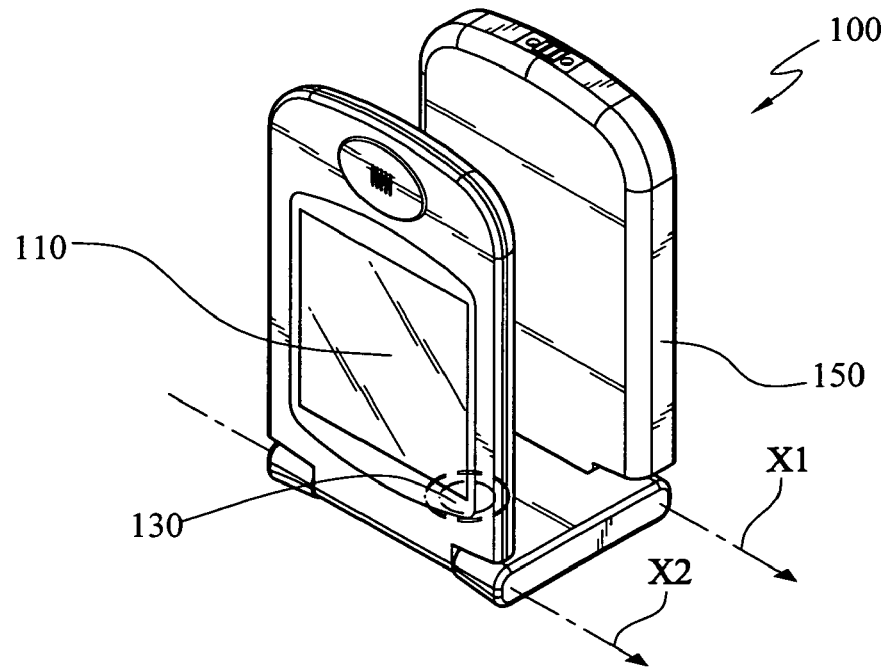

Refer to FIGS. 3A and 3B for a second use condition of the invention. The display screen 110 and the control module 150 can be turned so that both the display screen 110 and the control module 150 are normal to the image-taking module 130. That means that the control module 150 rotates around axis X1 and display screen 110 rotates around axis X2. As shown in FIG. 3A, users can see images on the display screen 110 to adjust the picture taking module 130, to get the optimal picture taking position, then take the picture through the control module 150. Thereby, while taking a picture of the sky, users can see the image without raising the head constantly. Similarly, while taking a picture of the bottom side, referring to FIG. 3B, users can see the image captured by the picture taking module 130 without lowering the head all the time.

Moreover, as the portable electronic device 100 consists of a display device 110, picture taking module 130 and control module 150, it adopts a "modular design". Hence by altering a portion, another model can be formed. Therefore, different models of varying functions can be designed to suit various consumer groups, but still adopt the structure of the display screen 110, picture taking module 130 and control module 150. For instance, the control module 150 may be substituted by a manual input control panel.

Figures 4A, 4B:
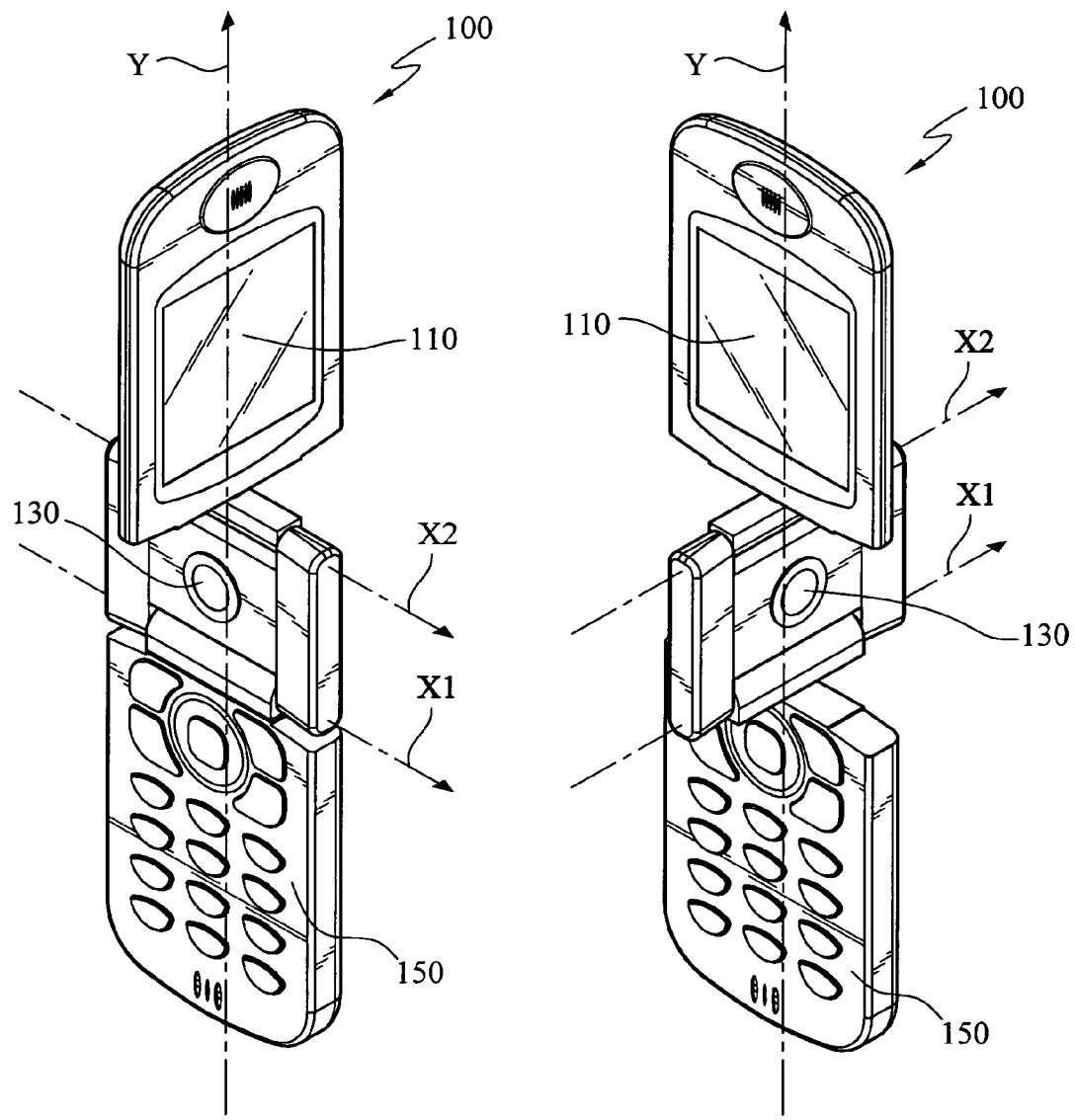
FIGS. 4A and 4B are schematic views of the invention in a third use condition.

Refer to FIGS. 4A and 4B for a third use condition of the invention. For taking sideward pictures, the display screen 110 can be swiveled horizontally to form 90 degrees or other desired angles with the picture taking module 130 as shown in FIG. 4A. That means that the display screen 110 rotates around axis Y. Or the picture taking module 130 can be swiveled to form 90 degrees or other desired angles with the display screen 110 and control module 150 (the picture taking module 130 rotates around axis Y), as shown in FIG. 4B. Thereby, the picture taking module 130 can be moved to face a targeted object, and users can see the image on the display screen 110 to adjust the position of the image taking module 130 to take pictures from different angles.

Figure 5:
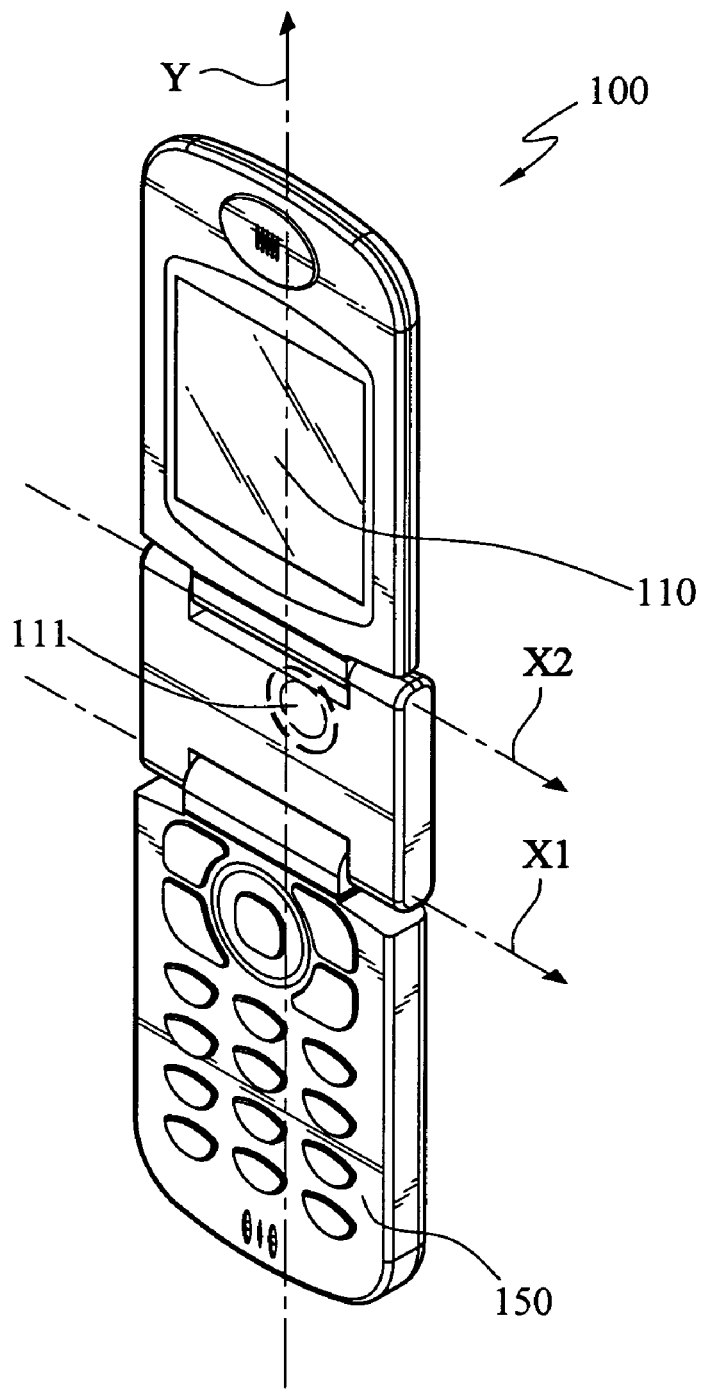
FIG. 5 is a schematic view of the invention in a fourth use condition.

Refer to FIG. 5 for a fourth use condition of the invention. The picture taking module 130 can function as a camera. With the picture taking module 130 facing a targeted object, a user sees the display screen 110 on the other side to adjust the picture taking module 130 relative to the targeted object. Hence by means of the structure of the invention, the picture taking module 130 can be swiveled 180 degrees in the opposite direction against the display screen 110. With the image taking module 130 facing the targeted object, and the display screen 110 facing the user, picture taking is convenient.

In short, the portable electronic device of the invention has three portions, namely a display screen, picture taking module and control module. These three portions can be swiveled relative to one another to form various use modes, to meet different requirements. In addition, the product is more versatile. By altering a portion of the product, a new model can be formed. Such a design makes the portable electronic device more competitive.

Knowing the invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A portable electronic device, comprising:
   a display screen;
   a picture taking module swivelably coupled with the display screen, the display screen being rotatable around both a first axis, and a second axis that is perpendicular to the first axis; and
   a control module swivelably coupled with the image taking module, the control module being rotatable around both a third axis that is perpendicular to the second axis, and the second axis, such that the display screen, the picture taking module and the control module are swivelable relative to one another at various angles to provide different operation modes.

2. The portable electronic device of claim 1, wherein the display screen is a liquid crystal display.

3. The portable electronic device of claim 1, wherein the picture taking module is a digital camera picture taking module.

4. The portable electronic device of claim 1, wherein the first axis is parallel to, and spaced away from, the third axis.

* * * * *